Jan. 25, 1966  C. E. THOMPSON  3,231,428
FUEL CELL WITH CATALYTIC ELECTRODES
Filed Jan. 3, 1961
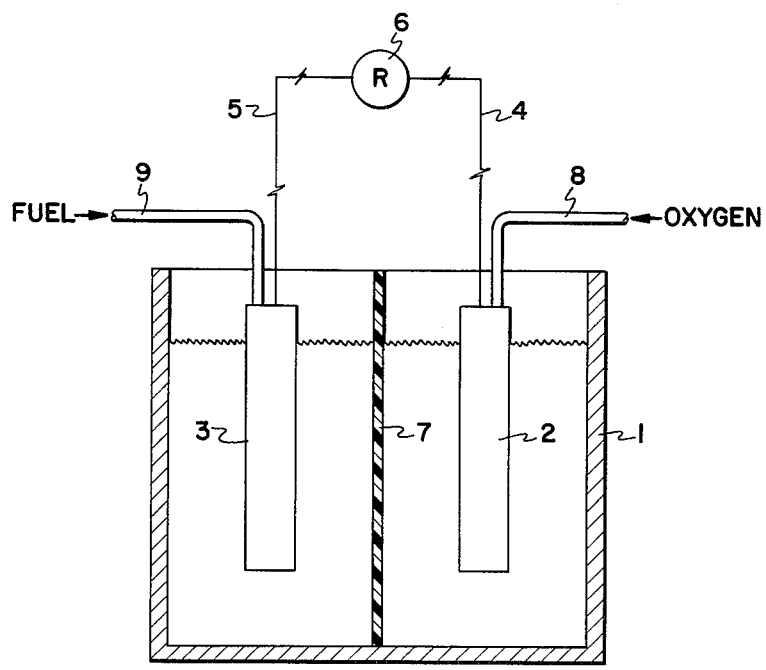
Charles E. Thompson INVENTOR
BY Alin B. Johnson
PATENT ATTORNEY

United States Patent Office 3,231,428
Patented Jan. 25, 1966

---

3,231,428
FUEL CELL WITH CATALYTIC ELECTRODES
Charles E. Thompson, Fanwood, N.J., assignor to Esso Research and Engineering Company, a corporation of Delaware
Filed Jan. 3, 1961, Ser. No. 80,480
4 Claims. (Cl. 136—86)

This application is a continuation-in-part of application Serial No. 827,984, filed May 7, 1959, now abandoned.

This invention relates to direct conversion of chemical energy to electrical energy by electrochemical reaction in a fuel cell employing an acidic electrolyte. In particular, this invention relates to novel catalysts, the electrodes with which such catalysts are associated and to fuel cells wherein such electrodes are employed. More particularly, this invention relates to the use of platinum and iridium catalysts in association with a fuel cell cathode in an acid system.

The term "fuel cell" has been used in the art to denote a primary battery wherein electrical energy is generated and an electrical potential produced directly, i.e. via electrochemical reaction from the chemical energy of a combustible fuel, e.g. hydrogen, carbon monoxide, or an organic compound, such as a $C_1$ to $C_{12}$ hydrocarbon or oxygen substituted hydrocarbon. The true fuel cell differs from other primary batteries, such as the conventional storage battery, in that the fuel and oxidant are made continuously available to the cell from an outside source and the electrodes are neither consumed nor deactivated by the reaction occurring within the cell.

A fuel cell will include at least one fuel electrode and at least one oxygen electrode, either an electrolyte extending from a fuel electrode to an oxygen electrode or an anolyte in contact with a fuel electrode and in ion-exchange with a catholyte in contact with an oxygen electrode, means for passing a fuel gas or liquid into dual contact with electrolyte and fuel electrode, means for passing an oxidizing gas into dual contact with electrolyte and oxygen electrode and means for recovering electrical energy generated in such cell. The terms "anode" and "fuel electrode" are used interchangeably herein as are the terms "cathode" and "oxygen electrode."

Fuel cells may vary in design and various operating techniques may be employed to fit specific purposes or materials. However, certain essentials of operation will be present in any practical fuel cell system. Thus, a fluid fuel, e.g. gas or liquid, is either passed into a porous electrode which is in contact with an electrolyte so as to admit of dual contact of such fuel with electrolyte and electrode surface, or an electrolyte-soluble fuel is admitted to electrolyte in contact with the fuel electrode. In the latter case the fuel electrode may be porous or nonporous. A catalyst is associated with the fuel electrode, e.g. as an addition to or as an integral part of the electrode base, to promote the anodic half-cell reaction wherein fuel is electrochemically oxidized with a release of electrons to a surface of the fuel electrode. The oxidizing gas is brought to an interface between electrolyte and oxygen electrode in like manner. A net flow of electrons from anode to cathode occurs external to the electroyte either via a direct external conduction or through cells connected in series and/or parallel. As a result oxidant and electrolyte meet in contact with the electron supplying oxygen electrode in the presence of catalyst initiating the cathodic half-cell reaction. Thus, in an operating cell ionic conductance across the electrolyte together with external electron conduction between electrodes completes the electrochemical circuit which includes the anodic and cathodic half-cell reactions.

Fuel cell catalysis may be divided into four primary units of function or use. In considering the reactions to be initiated and/or accelerated by a fuel cell catalyst the problems involved will be more easily understood by referring to a simple embodiment of the fuel cell. A cell utilizing hydrogen fuel does not involve $CO_2$ formation and other complications of reaction encountered with organic fuels yet is adequate for purposes of illustration. Fuel cell electrolytes known to the art, whether solid, liquid or paste, are either acids or bases. The reaction mechanisms involved when an acid is employed differ from those occurring with a caustic electrolyte. Thus, for instance, in a cell employing aqueous potassium hydroxide as the electrolyte a rapid formation of hydroxyl ions occurs at the oxygen electrode. Such ions are deemed to migrate to the fuel electrode where water is formed and electrons given up to the fuel electrode surface. When acids are substituted the hydroxyl concentration in the electrolyte of an operating cell is insignificant and the reaction proceeds via a different mechanism. The formation of water is deemed to occur at the cathode in an acid system.

Thus, initially, electrodes and catalyst associated therewith must be considered in relation to the chemical characteristics of the electrolyte with which they are to be employed. For example, nickel oxide, an effective cathode catalyst in a caustic cell, is essentially useless for this purpose in an acid medium.

Once the character of the electrolyte is established, fuel cell catalysts suitable for use with such electrolyte must be divided between those which effectively promote the anodic half-cell reaction and those suitable for promoting the cathodic half-cell reaction. The half-cell reaction at the cathode is essentially independent of the particular fuel chosen to supply energy for the cell. Thus, for all practical purposes, the effectiveness of a given cathode (oxygen electrode) is not conditioned upon whether hydrogen or carbonaceous fuels are reacted at the anode. Obviously, however, the fuels to be employed may be a major consideration in the selection of an anode (fuel electrode) catalyst, the activity requirements for easily chemisorbed hydrogen being less formidable than those necessary for breaking a carbon-to-carbon bond.

This invention relates specifically to improved catalysts for use at the oxygen electrode in systems employing acidic electrolytes.

It now has been discovered that a mixture of platinum and iridium provides a surprisingly superior cathode catalyst when such catalyst is employed in an acid medium. Platinum and iridium alloys have been successfully employed at the fuel electrode in a caustic medium, e.g. with KOH electrolyte. With caustic electrolytes metal oxides have been considered the most active cathodic catalysts. The metal oxides of Group Ib metals have been reported to be superior to oxides of Group VIII metals and oxides of alloys of Group VIII and Ib metals. The use of platinum to catalyze the cathodic half-cell reaction in an acid medium is known in the art. If iridium is substituted for platinum the activity of the cathodic half-cell and hence the activity of the complete cell is noticeably decreased. It is therefore surprising to find that in acid mediums alloys of platinum and iridium in accordance with this invention will provide a catalytic effect at the oxygen electrode greatly superior to either of the constituent metals. The catalysts of this invention may be employed upon any conductor base, e.g. porous carbon, steel, platinum, etc. Of these, porous carbon is preferred.

Where the platinum-iridium catalyst is used in association with a porous carbon base the amount of catalyst deposited thereon advantageously is above about 0.1 wt. percent based upon total weight of catalyst and carbon base. It is preferred to employ an amount in the range of about 1 to 2.5 weight percent although greater amounts can be used. The electrode base should be coated with catalyst if such base is not chemically inert in relation to the electrolyte employed.

Any mixture of platinum and iridium provides an operable catalyst since each metal provides some catalytic activity. However, in accordance with this invention the amount of iridium in a mixed metal catalyst of platinum and iridium should be in the range of about .003 to 50, preferably about .003 to 20 wt. percent. Exceptional results have been obtained with platinum comprising anode catalysts containing admixed iridium in the range of about 1 to 10 wt. percent.

While I do not wish to be restricted to any particular method of admixing or alloying platinum with iridium to provide the catalyst of this invention, or to any specific method for their incorporation in or association with fuel cell electrodes, suitable methods for the preparation of such catalysts and electrodes are hereinafter set forth for use as a guide by those skilled in the art.

In a preferred method of preparation, a shaped porous carbon electrode is soaked in a solution of water-soluble platinum and iridium salts, e.g. the cholrides, nitrates, etc. of such metals. Preferably the carbon to be impregnated is placed under vacuum to remove air from the pores and to facilitate entrance of the catalyst containing solution. After soaking, the carbon is dried, e.g. at a temperature of 200–300° F. and then heated to a temperature in the range of about 600–1000° F. under nitrogen, e.g. from about 1–5 hours, to decompose the metal containing compounds. Reduction is effected by heating the electrode under hydrogen, e.g. for about 1–5, preferably about 2–4 hours, at a temperature in the range of about 600–1000° F.

In a second method, the electrode base is placed in a conventional electrodeposition cell having a bath containing a solution of platinum and iridium salts so as to form the negative electrode of the electrodeposition cell. A direct electric current is passed through the bath with sufficient voltage to effect electrodeposition of platinum and iridium upon the electrode base. In the alternative, platinum and iridium may be deposited in separate treatments if adequate controls are employed to effect a good mixture of the two metals on the exposed surfaces.

It is preferred that iridium, the minor component, be intimately mixed with the particulate platinum providing the greatest possible uniformity of dispersion. The platinum and iridium should be applied in as small a particle size as possible to obtain the best results. It is preferred not to have the particle size exceed 100 A. in diameter.

Referring now to the accompanying drawing, which illustrates a simple embodiment of a fuel cell wherein the catalysts and electrodes of this invention may be advantageously employed. In the illustrated cell an acidic electrolyte solution, e.g. aqueous $H_2SO_4$ or other mineral acid, is retained in an open vessel 1. Vessel 1 may be constructed of glass, porcelain, high molecular weight polymer, or other suitable corrosion-resistant material which will not contaminate the electrolyte. Inside vessel 1 extended into the electrolyte are positioned a cathode (oxygen electrode) 2 and an anode (fuel electrode) 3. The electrodes are spaced apart with each partially immersed in the electrolyte solution. Electrodes 2 and 3 are connected to an external electrical circuit represented here by wires 4 and 5 and a resistance means 6, e.g. an electric motor, light bulb, etc. The electrolyte is shown divided by an electrolyte separator 7, i.e. an ion permeable membrane or ion exchange resin, etc. Materials of this type are well known in the art and their use for this purpose does not comprise a part of this invention. The electrolyte surrounding the cathode and that surrounding the anode may therefore be referred to as the catholyte and the anolyte, respectively. When an electrolyte soluble fuel, e.g. low molecular weight alcohols, carboxylic acids, aldehydes, etc., is employed separator 7 serves to keep unreacted fuel from reaching the cathode. In other embodiments of the cell the separator may be dispensed with even when electrolyte soluble fuels are employed. In operating the illustrated cell fuel is made continuously available via fuel conduit 9 to the interior of porous anode 3 through which it will diffuse until contact is made with the electrolyte. Suitable fuels include hydrogen, and both gas and liquid carbonaceous fuels, such as hydrocarbons and oxygenated hydrocarbons consisting of carbon, hydrogen and oxygen. An oxidizing gas, preferably air or substantially pure oxygen, is passed into the interior of porous cathode 2 via oxygen conduit 8. Such oxidant then moves by diffusion through the pores of the cathode to establish contact with the electrolyte. In other embodiments, the fuel employed is soluble in the electrolyte, particularly where it may be admitted to the electrolyte by means other than diffusion through a porous anode. It is to be understood that more complex cell designs will ordinarily be employed and that a large number of such cells may be arranged for use together.

Since the functions of the cathode and anode constitute essentially independent operations, the choice of cathode is not dependent upon the nature of the fuel electrode. While the sum total of cell performance is dependent upon both the anode and cathode, the relative value of individual electrodes can be determined independently of total cell performance.

The following examples are submitted to more fully explain the instant invention and the details thereof, and should not be construed as limitations upon the true scope of this invention as set forth in the claims.

EXAMPLE I

Porous carbon cylinders were placed under reduced pressure, e.g. about 0.001 atmosphere. to facilitate the penetration of a treating solution throughout the porous structure. The cylinders were then soaked in an aqueous solution containing both chloroplatinic acid and iridium tribromide for about 5 to 6 hours at 180° F. The total concentration of the two metal containing compounds in the solution was about 5 wt. percent. Controls were prepared in the same manner using a 5 wt. percent aqueous solution of chloroplatinic acid for a platinum control and a 5 wt. percent aqueous solution of iridium tribromide for an iridium control. Where the compounds were mixed the weight percentages of iridium used in relation to total metal weight, i.e. weight of platinum plus iridium, were 5.0, 20.0, 50.0 and 80.0 wt. percent. For comparison with another alloy of platinum an additional electrode was soaked in a similar solution wherein the metal constituents were 95 wt. percent platinum and 5 wt. percent gold. The cylinders were then dried at about 230° F. and subsequently heated to above about 800° F. under nitrogen for about 2 hours to decompose the adsorbed and/or absorbed metal-containing compounds. The electrodes were then maintained at a temperature of above about 800° F. in a hydrogen atmosphere for about 2 hours. The total metal deposited was in the range of about 1–2.5 wt. percent. The electrodes were next given a wet proofing treatment wherein small particles of polytetrafluoroethylene were electrodeposited upon the surfaces of the larger pores of the carbon electrode base in accordance with the method set forth in my copending application Serial No. 23,772, filed April 21, 1960, now Patent 3,113,048.

The platinum-iridium comprising electrodes so prepared were tested as the cathode in a fuel cell similar to that shown in the drawing. Hydrogen was supplied to the cell anode. The cell was operated at 180° F. at one atmosphere absolute using a 30 wt. percent $H_2SO_4$ aqueous electrolyte. Oxygen gas was employed as the oxidant. The control electrodes were tested in like manner. The performance afforded by each of these electrodes was measured after allowing the cell to run until operational equilibrium had been established to avoid erratic behavior inherent in cell startup. The results of these comparative runs are set forth in Tables I, II and III. Table I shows the comparative polarizations occurring at a constant amperage. Table II shows the current density in amperes per square foot (superficial external area of cathode) at a constant voltage. Table III shows the results of varying the ratio of iridium to platinum in such alloys.

*Table I.—Polarization at constant current flow*

| Cathode catalyst Composition | Open circuit voltage cathode half-cell vs. standard hydrogen | Polarization of cathode at— | |
|---|---|---|---|
| | | 50 amps./ft.$^2$ | 100 amps./ft.$^2$ |
| Pt | 0.96 | 0.26 | 0.33 |
| Ir | 0.86 | 0.21 | (a) |
| 95% Pt—5% Au | 1.00 | 0.22 | 0.27 |
| 95% Pt—5% Ir | 1.02 | 0.12 | 0.14 | a This cell did not develop this level of current density when iridium was the sole metal on the carbon base.

*Table II.—Current density at constant voltage*

| Cathode catalyst composition | Open circuit voltage cathode half-cell vs. standard hydrogen | Current density, amps./ft.$^2$ at cathode polarization | | |
|---|---|---|---|---|
| | | 0.15 volts | 0.20 volts | 0.30 volts |
| Pt | 0.96 | 18 | 27 | 80 |
| Ir | 0.86 | 26 | 46 | (a) |
| 95% Pt—5% Au | 1.00 | 15 | 35 | 150 |
| 95% Pt—5% Ir | 1.02 | 120 | (a) | (a) | a Polarization did not reach this level at maximum current.

*Table III.—Effect of oridium to platinum ratio in cathode catalysts*

| Cathode catalyst, Percent Iridium a | Open circuit voltage cathode half-cell vs. standard hydrogen | Polarization of cathode at— | |
|---|---|---|---|
| | | 50 amps./ft.$^2$ | 100 amps./ft.$^2$ |
| 0 | 0.96 | 0.26 | 0.33 |
| 5 | 1.02 | 0.12 | 0.14 |
| 20 | 0.99 | 0.16 | 0.20 |
| 50 | 1.00 | 0.16 | 0.20 |
| 80 | 1.00 | 0.24 | 0.29 |
| 100 | 0.86 | 0.21 | (b) | a Total metal catalyst taken as 100 wt. percent with platinum accounting for balance where Ir less than 100%.
b This cell did not develop this level of current density when iridium was the sole metal on the carbon base.

EXAMPLE II

Platinum-iridium catalyzed carbon electrodes were tested as in Example I varying the amount of total catalyst deposited from about 1 to about 2.5 wt. percent. The ratio of platinum to iridium was held constant. No appreciable difference in performance occurred.

EXAMPLE III

Electrodes are prepared by electrodeposition of platinum and iridium upon a stainless steel wire base. The completed electrodes are used as the cathode of a fuel cell with acid electrolyte and a performance improvement is demonstrated over duplicate electrodes having platinum alone and iridium alone deposited thereon.

EXAMPLE IV

A further test of a platinum-iridium on carbon electrode was carried out using such electrode as the cathode of a cell employing an aqueous sulfuric acid electrolyte as in Example I except that the amount of iridium in the platinum-iridium particulate mixture was about 0.003 wt. percent. Polarization of the cathode at a current of 50 amp./ft.$^2$ was even lower than for the cathode of Example I containing 5 wt. percent iridium at an equivalent aging time. Electrodes having catalysts of platinum and iridium tend to improve with use.

EXAMPLE V

An electrode comprising porous carbon impregnated with about 1–2 wt. percent of a metal catalyst consisting of about 95 parts (by weight) platinum and 5 parts iridium was employed as the cathode of a fuel cell wherein methanol was dissolved in the electrolyte. The fuel electrode was platinum black electrodeposited on a platinum base. An undivided electrolyte was employed, i.e. the fuel was not separated from the cathode. After the usual startup adjustments had been completed the electrode performed steadily as a fixed current was drawn from the cell.

EXAMPLE VI

A fuel cell was operated as in Example I using an aqueous $H_2SO_4$ electrolyte and ethane fuel. Both the anode and cathode used were porous carbon impregnated with about 1–3 wt. percent metal catalyst consisting of about 95 parts (by weight) platinum and 5 parts iridium. The current drawn from the cell at a constant voltage exceeded that drawn when an anode consisting of porous carbon impregnated only with platinum was substituted.

EXAMPLE VII

The platinum-iridium catalyst on carbon electrodes are tested further demonstrating their surprising superiority as cathodes with an acid electrolyte in the manner hereinbefore described except that the percentage of iridium is changed to 0.5, 1.0, 2.5 and 10.0, respectively. It is demonstrated with these tests and in the foregoing examples that such catalysts offer an outstanding performance when iridium is the minor component and platinum the major component. That such electrodes provide the better performance when the iridium content is maintained below about 20 wt. percent, particularly in the range of about 0.003 to 10 wt. percent.

All references to the Periodic Table or to elements or groups thereof refer to the 1959 Rev. ed. of the Periodic Chart of the Atoms designed by Henry D. Hubbard, revised by William F. Meggers and published by the W. M. Welch Mfg. Co.

The term "fluid fuel" as used herein is restricted to gases and liquids.

What is claimed is:

1. A fuel cell comprising an electrolyte container with aqueous sulfuric acid electrolyte therein, an anode and a cathode spaced apart and immersed in said electrolyte, a mixed catalyst consisting of a minor amount of iridium and a major amount of platinum on each of said anode and said cathode, said metal catalyst consisting essentially of particles having an average diameter of less than about 100 angstrom units, transfer means for passing a $C_1$ to $C_{12}$ hydrogen fuel into dual contact with said anode and said electrolyte, transfer means for passing oxygen into dual contact with said cathode and said electrolyte and conduction means external to said electrolyte container establishing electrical connection between said anode and said cathode.

2. A fuel cell in accordance with claim 1 wherein said metal catalyst contains about 0.003 to 50 wt. percent iridium.

3. A fuel cell in accordance with claim 1 wherein said catalyst contains about 1 to 10 wt. percent iridium.

4. A fuel cell in accordance with claim 1 wherein said metal catalyst consists of about 0.003 to 20 wt. percent iridium.

References Cited by the Examiner

UNITED STATES PATENTS

| | | | |
|---|---|---|---|
| 1,243,111 | 10/1917 | Sanders | 136—20 |
| 2,384,463 | 9/1945 | Gunn et al. | 136—86 |
| 2,654,795 | 10/1953 | Brill et al. | 136—120 |
| 2,860,175 | 11/1958 | Justi | 136—86 |
| 2,901,523 | 8/1959 | Justi et al. | 136—86 |
| 2,980,749 | 4/1961 | Broers | 136—86 |

JOHN H. MACK, *Primary Examiner.*

JOHN R. SPECK, *Examiner.*